United States Patent
Nishino et al.

(10) Patent No.: US 9,278,676 B2
(45) Date of Patent: Mar. 8, 2016

(54) BRAKE CONTROL DEVICE

(75) Inventors: Kimio Nishino, Minami-alps (JP); Toshiyuki Innami, Mito (JP); Norikazu Matsuzaki, Minami-alps (JP); Masayuki Kikawa, Kai (JP); Ayumu Miyajima, Hitachinaka (JP); Toshiyuki Ajima, Tokai (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 345 days.

(21) Appl. No.: 13/148,952

(22) PCT Filed: Feb. 25, 2010

(86) PCT No.: PCT/JP2010/052915
§ 371 (c)(1),
(2), (4) Date: Aug. 11, 2011

(87) PCT Pub. No.: WO2010/113574
PCT Pub. Date: Oct. 7, 2010

(65) Prior Publication Data
US 2011/0316329 A1 Dec. 29, 2011

(30) Foreign Application Priority Data
Mar. 31, 2009 (JP) .................................. 2009-083994

(51) Int. Cl.
*B60T 8/88* (2006.01)
*B60T 8/44* (2006.01)
(Continued)

(52) U.S. Cl.
CPC ................. *B60T 8/442* (2013.01); *B60T 7/042* (2013.01); *B60T 8/321* (2013.01); *B60T 8/4872* (2013.01); *B60T 8/96* (2013.01); *B60T 13/745* (2013.01); *B60T 8/885* (2013.01)

(58) Field of Classification Search
CPC combination set(s) only.
See application file for complete search history.

(56) References Cited

U.S. PATENT DOCUMENTS 6,238,016 B1    5/2001  Soga
6,354,672 B1 *  3/2002  Nakamura et al. .......... 303/113.1
(Continued)

FOREIGN PATENT DOCUMENTS

CN    101362460 A    2/2009
DE    101 60 619 A1   7/2002
(Continued)

OTHER PUBLICATIONS

German Office Action with English Translation dated Jul. 12, 2012 (Twelve (12) pages).
(Continued)

*Primary Examiner* — Thomas Irvin
(74) *Attorney, Agent, or Firm* — Crowell & Moring LLP (57) ABSTRACT

According to the present invention, limited electric power is consumed so as to achieve long-lasting use of electric power during brake control with the use of an auxiliary power supply source when there is a malfunction of a vehicle power supply source. In addition, a brake control device for ensuring responsiveness at the beginning of braking or when emergency braking is necessary is provided. The brake control device of the present invention is a brake control device for detecting electric signals generated depending on the degree of brake-pedal operation and calculating the driver's demanded braking force based on the electric signals so as to generate the demanded braking force, which comprises an auxiliary power supply source for supplying electric power to the brake control device when there is a malfunction of a vehicle power supply source and controls braking depending on the charged capacity of the auxiliary power supply source.

4 Claims, 9 Drawing Sheets

(51) Int. Cl.
*B60T 7/04* (2006.01)
*B60T 8/32* (2006.01)
*B60T 8/48* (2006.01)
*B60T 8/96* (2006.01)
*B60T 13/74* (2006.01)

(56) References Cited

U.S. PATENT DOCUMENTS

| | | | |
|---|---|---|---|
| 6,659,569 B2* | 12/2003 | Fukasawa | 303/122.03 |
| 6,728,614 B2* | 4/2004 | Matsubara et al. | 701/36 |
| 7,367,187 B2* | 5/2008 | Ikeda et al. | 60/545 |
| 8,167,383 B2 | 5/2012 | Nishino et al. | |
| 2002/0074854 A1 | 6/2002 | Fukasawa | |
| 2003/0233179 A1 | 12/2003 | Matsubara et al. | |
| 2007/0188019 A1* | 8/2007 | Maki et al. | 303/122.04 |
| 2007/0222284 A1* | 9/2007 | Matsubara et al. | 303/122.04 |
| 2009/0039702 A1 | 2/2009 | Nishino et al. | |
| 2009/0099745 A1* | 4/2009 | Karnjate et al. | 701/70 |
| 2013/0082514 A1* | 4/2013 | Murakami et al. | 303/14 |

FOREIGN PATENT DOCUMENTS

| | | | |
|---|---|---|---|
| JP | 11-99932 A | 4/1999 | |
| JP | 2000-62589 A | 2/2000 | |
| JP | 2000-177570 A | 6/2000 | |
| JP | 2003-153461 A | 5/2003 | |
| JP | 2004-17732 A | 1/2004 | |
| JP | 2009-40290 A | 2/2009 | |

OTHER PUBLICATIONS

International Search Report including English language translation dated Jun. 8, 2010 (Four (4) pages).
PCT/ISA/237 Form (Three (3) pages).
Chinese-language Office Action dated May 6, 2013 with English translation (Five (5) pages).
Japanese Office Action dated Oct. 8, 2013 (two (2) pages).

* cited by examiner

BRAKE CONTROL DEVICE

TECHNICAL FIELD

The present invention relates to a brake control device of a vehicle, and more particularly to a brake control device of a vehicle to generate either a braking force or an assisting force corresponding to the degree of brake-pedal operation.

BACKGROUND ART

In recent years, brake control devices of vehicles have been studied in which a braking force is assisted by electric power used as a drive force in response to brake-pedal operation. Such brake control devices are operated by supplying electric power from vehicle power supply sources. Thus, if there is a malfunction of a vehicle power supply source, it results in loss of operation. In order to cope with loss of operation, a brake control device that is electrically operated has a mechanical configuration in which a brake pedal depressing force is transmitted to the braking system of each wheel to cause generation of a braking force.

However, it is desirable for such brake control device to use electric power as a drive force to a maximum extent. JP Patent Application Publication No. 2004-17732 A (Patent Document 1) discloses a related technique. Patent Document 1 discloses a method for supplying electric power from an auxiliary power supply source when there is a malfunction of a main power supply source of a brake control device.

PRIOR ART DOCUMENTS

Patent Documents

Patent Document 1: JP Patent Application Publication No. 2004-17732 A

DISCLOSURE OF THE INVENTION

Problem to be Solved by the Invention

For a brake control device of a vehicle which has a system for switching to electric power supply from an auxiliary power supply source when there is a malfunction of a main power supply source, it is necessary to use a large auxiliary power supply source. This is problematic in terms of loadability of the vehicle.

An object of the present invention is to provide a brake control device of a vehicle with the improvement of loadability of the vehicle.

Means for Solving Problem

In order to achieve the above object, the present invention is characterized by the configuration described below.

A brake control device comprising a master cylinder for generating hydraulic pressure to generate a braking force, an electric motor for controlling hydraulic pressure in the master cylinder, a control circuit for generating an AC or DC current (hereafter referred to as "drive current") to drive the electric motor with electric power supplied from a main power supply source, and an auxiliary power supply source, wherein the control circuit calculates a demanded braking force corresponding to the degree of brake-pedal operation, the current for driving the electric motor is generated on the basis of the calculated demanded braking force, and the electric motor is controlled to convert hydraulic pressure generated in the master cylinder into the demanded braking force, and wherein the auxiliary power supply source supplies electric power to the control circuit when there is an abnormality in the main power supply source, and the current for driving the electric motor is controlled in a braking operation on the basis of the available electric energy supply from the auxiliary power supply source.

In order to achieve the above object, the present invention is characterized by another configuration described below.

A brake control device comprising: a master cylinder for transmitting hydraulic pressure to generate a braking force; an input piston for controlling hydraulic pressure in the master cylinder through movement by a distance that corresponds to the degree of brake-pedal operation; an assisting piston for controlling hydraulic pressure in the master cylinder together with the input piston; an electric motor for allowing the assisting piston to move; and a control circuit for controlling the electric motor based on the degree of brake-pedal operation, which has electric power terminals to receive electric power from a main power supply source and an auxiliary power supply source, respectively, wherein the control circuit controls the electric motor based on the degree of brake-pedal operation when it is operated with electric power from the main power source, provided that a limit is imposed on the current for driving the electric motor when the control circuit is operated with electric power from the auxiliary power source.

Effects of the Invention

The present invention is advantageous in terms of the improvement of loadability of the vehicle.

In addition to the above object, different objects sought to be achieved for commercialization of the present invention have been realized in the embodiments described below. Such objects include the improvement of safety, reliability, and the like.

BEST MODE FOR CARRYING OUT THE INVENTION

The embodiments of the present invention are described below with reference to the drawings.

Embodiment 1

Figure 1:
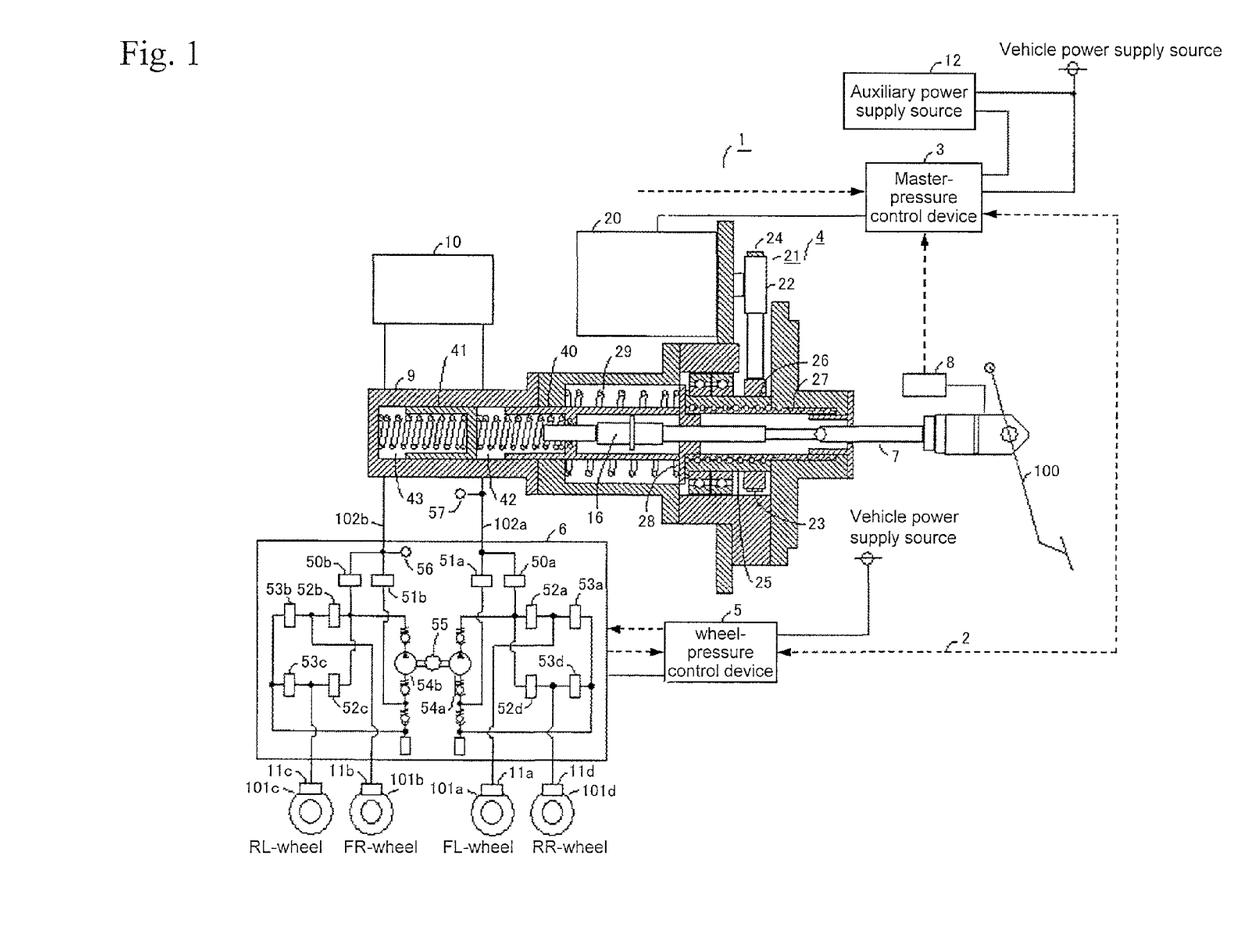
FIG. 1 illustrates an overall configuration of the brake control system according to the embodiments of the present invention.

FIG. 1 is a block diagram illustrating an overall configuration of the brake control device. In FIG. 1, the arrowed dash lines represent signal lines, and the arrows indicate the direction in which their respective signals flow. A brake control system 1 comprises a master-cylinder pressure controlling mechanism 4 provided with an electric motor 20 for controlling master-cylinder pressure that is output pressure from a master cylinder 9, a master-cylinder pressure control device 3 for electrically controlling the master-cylinder pressure controlling mechanism 4, a wheel-cylinder pressure controlling mechanism 6, a wheel-cylinder pressure control device 5 for electrically controlling the wheel-cylinder pressure controlling mechanism 6, an input rod 7, an operational degree detecting device 8, a master cylinder 9, a reservoir tank 10, and an auxiliary power supply source 12. A first pressurizing-depressurizing unit for changing output pressure from the master cylinder 9 has an input rod 7 which moves in response to operation of a brake pedal 100 and an input piston 16 for controlling pressure in a primary fluid chamber 42 of the master cylinder 9 which is provided on the master cylinder side 9 of the input rod 7. A second pressurizing-depressurizing unit for changing output pressure from the master cylinder 9 has the master-cylinder pressure control device 3, the master-cylinder pressure controlling mechanism 4, and an assisting piston 40 controlled by the master-cylinder pressure controlling mechanism 4. In addition, as described below, each of the input piston 16 and the assisting piston 40 functions as a primary piston which controls hydraulic pressure in the primary fluid chamber 42.

Two-way communications are allowed between the master-cylinder pressure control device 3 and the wheel-cylinder pressure control device 5. The master-cylinder pressure control device 3 and the wheel-cylinder pressure control device 5 share control commands and the parameters representing conditions of the vehicle. The parameters representing conditions of the vehicle include values and data representing yaw rate, longitudinal acceleration, lateral acceleration, steering angle of the steering wheel, speed of each wheel, speed of the vehicle, failure information, operation state, and the like.

The master-cylinder pressure control device 3 for carrying out brake control is operated by electric power supplied from a vehicle power supply source that is a battery mounted on a vehicle and controls the electric motor 20 on the basis of the degree of braking operation corresponding to a value detected by the operational degree detecting device 8. The term "vehicle power supply source" used herein refers to a vehicle battery or a vehicle power generator. The term refers to an alternator or a battery for a conventional vehicle. In addition, the terms refers to a low voltage battery or a DC/DC converter for converting the voltage of a high voltage power supply source to the voltage of a low voltage power supply source such as a 12V or 24V power supply source for a hybrid vehicle or an electric vehicle. According to the motor drive current output from the master-cylinder pressure control device 3, the master-cylinder pressure controlling mechanism 4 pushes the assisting piston 40. The master-cylinder pressure controlling mechanism 4 comprises the electric motor 20 to generate a rotational torque, a speed-reduction device 21 to amplify the rotational torque of the electric motor 20, and a rotation-translation movement converting device 25 to convert a rotation movement to a translation movement.

The wheel-cylinder pressure control device 5 is operated by electric power supplied from a vehicle power supply source and has a control function for preventing each wheel from being locked, a function for controlling wheel cylinder pressure in each wheel for stabilizing behaviors of the vehicle, and other functions. It calculates the desired braking force necessary to generate for each wheel on the basis of the parameters representing conditions of the vehicle and controls the wheel-cylinder pressure controlling mechanism 6 according to the calculated value. The wheel-cylinder pressure controlling mechanism 6 receives brake fluid pressurized in the master cylinder 9 in response to the output from the wheel-cylinder pressure control device 5 and controls the pressure of brake fluid to be supplied to each of wheel cylinders 11a to 11d so as to generate a friction braking force for each wheel.

One end of the input rod 7 is connected to the brake pedal 100, while the other end is connected to the input piston 16 inserted into the primary fluid chamber 42. The input rod 7 drives the input piston 16. This configuration allows the master-cylinder pressure to be increased also by a braking operation of the driver. So, in the event that the electric motor 20 stops, a braking force can be generated. In addition, a reactive force proportional to the master-cylinder pressure is transmitted through the input rod 7 and is exerted on the brake pedal 100. This force is transmitted, as a brake-pedal reactive force, to the driver.

The operational degree detecting device 8 comprises at least one sensor to detect the demanded braking force corresponding to the degree of brake-pedal operation of the driver. In addition, as a sensor used herein, a displacement sensor for detecting the moving angle of the brake pedal 100 or the moving distance of the input rod 7 is usually employed. Alternatively, a depressing-force sensor for detecting the depressing force exerted on the brake pedal 100 or a master-cylinder pressure sensor for detecting hydraulic pressure in the master cylinder 9 may be used.

In addition, the sensor configuration of the operational degree detecting device 8 may be a configuration in which at least two different types of sensors such as a displacement sensor, a depressing-force sensor, and a master-cylinder pressure sensor may be used in combination.

The master cylinder 9 is a tandem-type master cylinder that includes the following two compression chambers: the primary fluid chamber 42 to be compressed by the assisting piston 40; and a secondary fluid chamber 43 to be compressed by a secondary piston 41. The brake fluid in each compression chamber, which is pressurized by the assisting piston 40 or the input piston 16, is supplied through a corresponding one of master pipes 102a and 102b to the wheel-cylinder pressure controlling mechanism 6. The reservoir tank 10 is divided by an unillustrated partition wall into at least two fluid chambers. These fluid chambers are communicatively connected to the compression chambers of the master cylinder 9, respectively.

Each of the wheel cylinders 11a to 11d includes a cylinder, a piston, a brake pad, and the like (unillustrated). The brake fluid supplied from the wheel-cylinder pressure controlling mechanism 6 makes the piston move forward to press the pad connected to the piston onto a corresponding one of disc rotors 101a to 101d, resulting in generation of a friction braking force. Since the disc rotors rotate together with their respective wheels, the braking torque acting on each of the disc rotors serves as the braking force acting between each wheel and the road surface. Note that, in FIG. 1, the left front wheel is denoted by FL-wheel; the right front wheel by FR-wheel; the left rear wheel by RL-wheel; and the right rear wheel by RR-wheel.

The auxiliary power supply source 12 can store electric power and supply electric power to the master-cylinder pressure control device 3 when there is a malfunction of a vehicle power supply source. In view of reliability, it is appropriate to use a capacitor. In addition, a compact battery or a vehicle power supply source used in a different system may be used. In any case, electric energy that can be supplied from the auxiliary power supply source 12 is smaller than electric energy supplied from a main power supply source that mainly supplies electric energy to the master-cylinder pressure control device 3.

Next, descriptions will be given as to the configuration and the operation of the master-cylinder pressure controlling mechanism 4. When actuated by the motor drive current controlled by the master-cylinder pressure control device 3, the electric motor 20 generates a desired rotational torque. Any of a DC motor, a DC brushless motor, an AC motor, and the like is suitable and usable as the electric motor 20. A DC brushless motor is preferable for its controllability, quietness, and durability. The electric motor 20 is provided with a position sensor such as a resolver (shown as a rotational angle detecting sensor 205 in FIG. 2), which generates signals to be inputted into the master-cylinder pressure control device 3. So, the master-cylinder pressure control device 3 is capable of calculating the rotational angle, that is, the rotational degree of the electric motor 20 on the basis of the signals from the position sensor, and capable of calculating the degree of forward movement of the rotation-translation movement converting device 25, that is, the degree of displacement of the assisting piston 40, on the basis of the rotation angle thus calculated.

The speed-reduction device 21 is provided to amplify the rotational torque of the electric motor 20 by a proportion equivalent to the reduction ratio. The reduction in speed may be adequately achieved in several ways, such as using a set of gears, using a pulley mechanism, or the like. The example shown in FIG. 1 employs a pulley mechanism including a drive pulley 22, a driven pulley 33, and a belt 24 for the reduction in speed. If the electric motor 20 generates a rotational torque that is so large that the amplification of the torque via speed reduction is unnecessary, the electric motor 20 may be connected directly to the rotation-translation movement converting device 25 without the speed-reduction device 21 therebetween. This configuration allows avoidance of various problems that derive from the interposition of the speed-reduction device 21, i.e., problems related to the reliability, quietness, loadability, and the like.

The rotation-translation movement converting device 25 converts the rotational power of the electric motor 20 to a translatory power, and thus pushes the assisting piston 40. A rack-and-pinion, a ball-screw, or the like is suitable for the conversion mechanism. The example shown in FIG. 1 employs a ball-screw mechanism. According to such ball-screw mechanism, the driven pulley 23 is fitted to an outer circumference of the ball-screw nut 26. Rotation of the driven pulley 23 causes rotation of the ball-screw nut 26, which in turn causes a translation movement of a ball-screw shaft 27 along the axis thereof. The thrust thus produced pushes the assisting piston 40 via a movable member 28.

The movable member 28 engages with an end of a return spring 29 whereas the other end of the return spring 29 is connected to a fixed portion. A force in the opposite direction to the thrust of the ball-screw shaft 27 acts on the ball-screw shaft 27 via the movable member 28. Assume that, during the braking operation, i.e., while the assisting piston 40 is being pushed to increase the master-cylinder pressure, the electric motor 20 stops and thus the control to return the ball-screw shaft 27 becomes impossible. Even in this event, the reactive force of the return spring 29 returns the ball-screw shaft 27 back to the initial position, so that the master-cylinder pressure is lowered down to approximately zero. What can be avoided accordingly is unstable behavior of the vehicle that would otherwise be caused by drag of the braking force.

Next, descriptions will be given as to amplification of the thrust of the input rod 7. In Embodiment 1, to compress the primary fluid chamber 42, the thrust of the input rod 7 is amplified by displacing the assisting piston 40 in accordance with the degree of displacement of the input piston 16 via the input rod 7 caused by a braking operation of the driver so as to add thrust of the assisting piston 40 to thrust of the input rod 7. The ratio of amplification (hereinafter, referred to as the "boost ratio") is defined arbitrarily at a certain value by such factors as the ratio of the degree of displacement of the input rod 7 and that of the primary piston 40 as well as the ratio of the cross-sectional area of the input rod 16 and that of the assisting piston 40

In particular, when the assisting piston 40 is to be displaced by a distance that corresponds to the degree of displacement of the input rod 7, the boost ratio is uniquely defined as $(A_{IP}+A_{AP})/A_{IP}$, where "$A_{IP}$" is the cross-sectional area of the input piston 16 and "$A_{AP}$" is the cross-sectional area of the assisting piston 40. To put it differently, if $A_{IP}$, and $A_{AP}$ are determined on the basis of a required boost ratio and the assisting piston 40 is controlled so as to have an degree of displacement that is equal to the degree of displacement of the input piston 16, a certain boost ratio can be constantly obtained. Note that the degree of displacement of the assisting piston 40 is calculated by the master-cylinder pressure control device 3 on the basis of the signals generated by an unillustrated position sensor.

Next, descriptions will be given as to a process of implementing the variable boost function. A variable boost control process is defined as a process of control that displaces the assisting piston 40 by a distance obtained by multiplying the degree of displacement of the input piston 16 by a proportional gain (K1). Note that a desirable value of K1 is 1 in view of the controllability, but K1 can be temporally changed to a value larger than 1 in the case where a braking force that is larger than the degree of braking operation of the driver is needed, i.e., in the case of emergency braking. Accordingly, since the master-cylinder pressure is increased up to a level that is higher than that of the ordinary setting (when K1=1), a larger braking force than usual can be generated even with the same degree of braking operation of the driver. Note that whether the braking operation is or is not of emergency braking may be determined by, for example, determining whether the time rate of change in the level of the signals from the operational degree detecting device 8 is or is not above a predetermined value.

As described above, according to the variable boost control process, the master-cylinder pressure is either increased or decreased in response to the degree of displacement of the input rod 7, which is dependent on the braking demand of the driver. Accordingly, as much braking force as the driver demands can be generated. In addition, changing K1 to a value smaller than 1 allows a hybrid vehicle to employ a regenerative coordination braking control, by which the hydraulic braking force is reduced to a level corresponding to the regenerative braking force.

Next, descriptions will be given as to a process of implementing an automatic braking function. An automatic braking control process is defined as a process of moving, either forward or backward, the assisting piston 40 so that the operation pressure in the master cylinder 9 can be adjusted to the level of hydraulic pressure demanded for automatic braking (hereinafter, referred to as the "demanded automatic-brake hydraulic pressure"). Various methods of controlling the assisting piston 40 may be employed in this case. Such methods include a method in which, based on the relationship between the degree of displacement of the assisting piston 40 and the master-cylinder pressure which is acquired in advance and stored in a table, a target value is set by extracting a degree of displacement of the assisting piston 40 for achieving the demanded automatic-brake hydraulic pressure. In an alternative method, the master-cylinder pressure detected by a master-cylinder pressure sensor 57 is fed back. Any of such method may be employed. Note that the demanded automatic-brake hydraulic pressure may be provided by signals sent by an external unit. Such technique is applicable to the braking control such as the vehicle tracking control, the lane-departure avoidance control, or the obstacle avoidance control.

Next, descriptions will be given as to the configuration and the operation of the wheel-cylinder pressure controlling mechanism 6. The wheel-cylinder pressure controlling mechanism 6 comprises: gate outlet valves 50a and 50b for controlling the supply of the brake fluid pressurized in the master cylinder 9 to the individual wheel cylinders 11a to 11d; gate inlet valves 51a and 51b for controlling the supply of the brake fluid pressurized in the master cylinder 9 to pumps 54a and 54b; inlet valves 52a to 52d for controlling the supply of the brake fluid either from the master cylinder 9 or from the pumps 54a and 54b to the individual wheel cylinders 11a to 11d; outlet valves 53a to 53d for controlling the pressure applied to the wheel cylinders 11a to 11d by decreasing the pressure; the pumps 54a and 54b for further increasing the operation pressure generated in the master cylinder 9; a motor 55 for driving the pumps 54a and 54b; and a master-cylinder pressure sensor 56 for detecting the master-cylinder pressure. Note that either a hydraulic control unit for antilock braking control or a hydraulic control unit for vehicle-behavior stabilization control is suitable for the wheel-cylinder pressure controlling mechanism 6.

The wheel-cylinder pressure controlling mechanism 6 includes the following two brake circuits: a first brake circuit which is supplied with the brake fluid from the primary fluid chamber 42 and which controls the braking force of the FL-wheel and that of the RR-wheel; and a second brake circuit which is supplied with the brake fluid from the secondary fluid chamber 43 and which controls the braking force of the FR-wheel and that of the RL-wheel. Such a configuration guarantees a stable behavior of the vehicle even in a case of a malfunction of one of the two brake circuits, because the other one of the two brake circuits (i.e., a normally-operating brake circuit) can provide the braking force for the corresponding diagonally-positioned wheels.

The gate outlet valves 50a and 50b are disposed between the master cylinder 9 and the inlet valves 52a to 52d, and are opened to supply the brake fluid pressurized in the master cylinder 9 to the corresponding wheel cylinders 11a to 11d. The gate inlet valves 51a and 51b are disposed between the master cylinder 9 and the pumps 54a and 54b, and are opened to cause the pressure of the brake fluid pressurized in the master cylinder 9 to be further increased by the pumps 54a and 54b and to be supplied to the corresponding wheel cylinders 11a to 11d.

The inlet valves 52a to 52d are provided respectively at positions upstream of the wheel cylinders 11a to 11d, and are opened to supply the brake fluid pressurized either in the master cylinder 9 or the pumps 54a and 54b to the corresponding wheel cylinders 11a to 11d. The outlet valves 53a to 53d are provided respectively at positions downstream of the wheel cylinders 11a to 11d, and are opened to reduce the wheel pressure. Note that the gate outlet valves 50a and 50b, the gate inlet valves 51a and 51b, the inlet valves 52a to 52d, and the outlet valves 53a to 53d are electromagnetic valves, which are opened and closed by energizing the corresponding solenoids (not illustrated). The degree of opening or closing of each valve is individually adjustable by the current control performed by the wheel-cylinder pressure control device 5.

In Embodiment 1, the gate outlet valves 50a and 50b, and the inlet valves 52a to 52d are normally-open valves whereas the gate inlet valves 51a and 51b and the outlet valves 53a to 53d are normally-closed valves. With this configuration, in an event that the electric-power supply to the valves is ceased due to a failure, the gate inlet valves 51a and 51b and the outlet valves 53a to 53d remain closed whereas the gate outlet valves 50a and 50b and the inlet valves 52a to 52d remain open. The brake fluid pressurized in the master cylinder 9 can thus reach all the wheel cylinders 11a to 11d, so that as much braking force as the driver demands can be generated.

In a case where a pressure that is larger than the operation pressure in the master cylinder 9 is necessary to perform the vehicle-behavior stabilization control, the automatic braking, or the like, the pumps 54a and 54b further increase the master-cylinder pressure and transmit the increased pressure to the wheel cylinders 11a to 11d. Plunger pumps, trochoid pumps, gear pumps, and the like are suitable and usable for the pumps 54a and 54b.

The motor 55 is actuated by the electric power supplied in response to the control commands of the wheel-cylinder pressure control device 5, and drives the pumps 54a and 54b connected to the motor 55. Any of a DC motor, a DC brushless motor, an AC motor, and the like is suitable and usable for the motor 55.

The master-cylinder pressure sensor 56 is disposed on the downstream of the secondary-side master pipe 102b, and is a pressure sensor to detect the master-cylinder pressure. How many and where master-cylinder pressure sensors 56 to be disposed can be determined as appropriate in consideration of the controllability, the fail-safe function, and the like.

The configuration and the operation of the wheel-cylinder pressure controlling mechanism 6 are described above. When there is a failure in the master-cylinder pressure control device 3, the degree of braking operation of the driver is detected by the wheel-cylinder pressure control device 6 on the basis of the pressure of the brake fluid detected by the master-cylinder pressure sensor 56, and then the wheel-cylinder pressure control device 6 controls the pumps 54b and 54b and the like such that a wheel-cylinder pressure corresponding to the detected value is generated.

Figure 2:
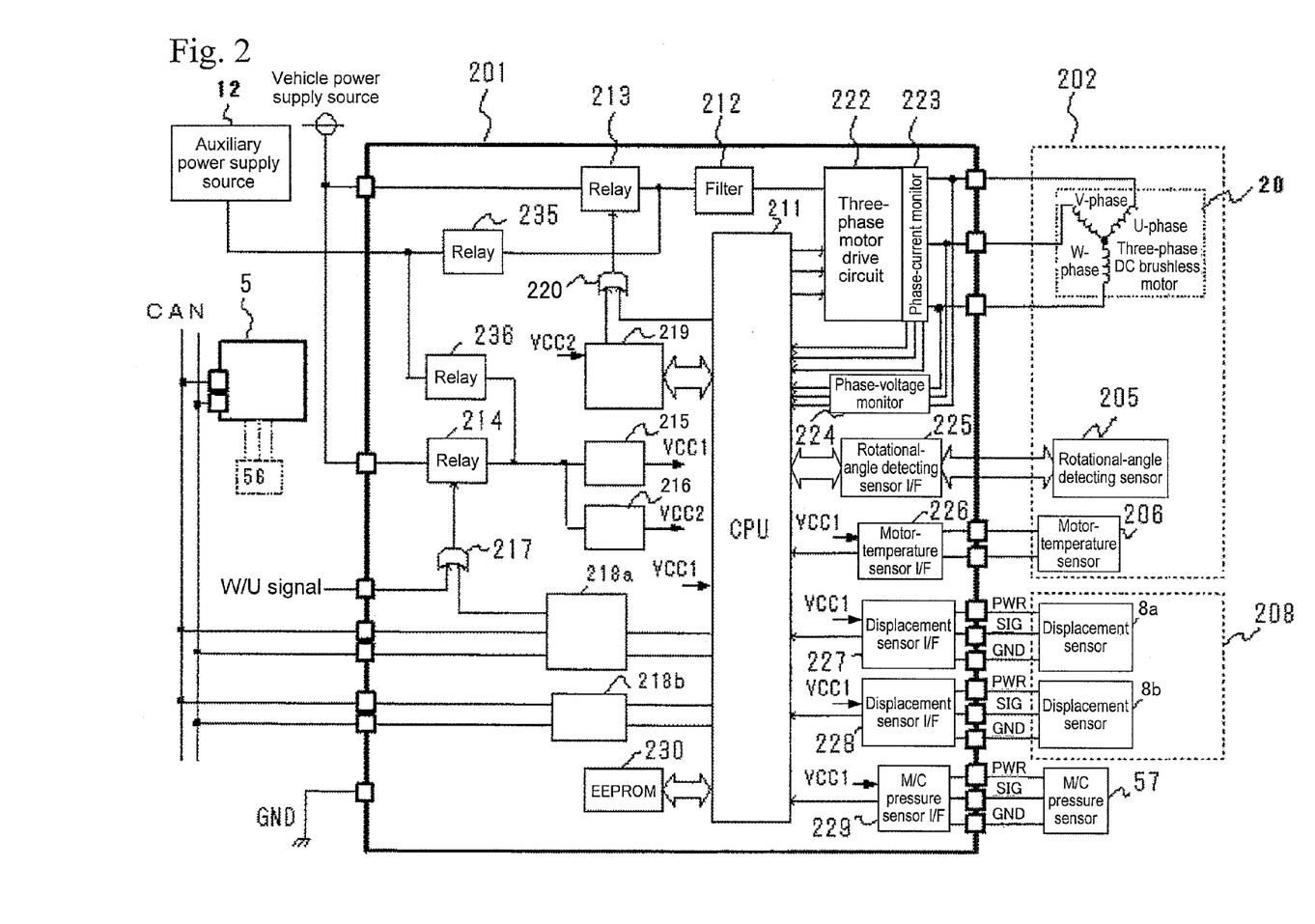
FIG. 2 illustrates a circuit configuration of a master-cylinder pressure control device for the brake control device according to the embodiments of the present invention.

FIG. 2 illustrates an example of a circuit configuration of the master-cylinder pressure control device 3 shown in FIG. 1. The circuit of the master-cylinder pressure control device 3 is shown within an area demarcated by a thick solid line 201 in FIG. 2. Each of the electric part or the electric circuit of the master-cylinder pressure controlling mechanism 4 is shown within an area demarcated by a dotted line 202 in FIG. 2. The wheel-cylinder pressure control device 5 is shown within an area demarcated by a thick solid line 5. In addition, a sensor of the operational degree detecting device 8 is shown within an area demarcated by a dotted line 208. In the example shown in FIG. 2, the configuration in which two displacement sensors are provided is illustrated. However, at least one displacement sensor may be provided. In the above configuration, a sensor used herein may be a depressing-force sensor or a master-cylinder pressure sensor. Alternatively, a combination of at least two different sensors may be used.

Firstly, the electric circuit demarcated by the thick solid line 201 will be described. The electric power supplied from the vehicle power-supply line via an ECU power-supply relay 214 is inputted into a 5-V power-supply circuit 215 (hereinafter referred to as "first power supply circuit 215") and a 5-V power-supply circuit 216 (hereinafter referred to as "second power supply circuit 216"). In the circuit configuration, the ECU power-supply relay 214 is turned on by either a start signal or a start signal generated by a CAN communication I/F circuit 218 in response to a CAN reception. Any of a door switch signal, a brake switch signal, and an IGN switch signal may be used as the start signal. If a plurality of start signals are used, all the signals are taken in the master-cylinder pressure control device 3. Then, when a switch for any one of the plurality of switch signals is turned on, the start signal turns the ECU power-supply relay 214 on. In addition, when there is a malfunction of a vehicle power supply source, electric power supplied from the auxiliary power supply source 12 via the auxiliary power supply relay 236 can be supplied to the first power supply circuit 215 and the second power supply circuit 216. The stable power-supply source ($V_{CC}1$) obtained by the first power-supply circuit 215 is supplied to a central control circuit (CPU) 211 whereas the stable power-supply source ($V_{CC}2$) obtained by the second power supply circuit 216 is supplied to a supervisory control circuit 219.

A fail-safe relay circuit 213 is capable of cutting off the electric power supplied from the vehicle power-supply line to a three-phase motor drive circuit 222. The supply of electric power to the three-phase motor drive circuit 222 and the cutting-off of the electric power supply can be controlled by use of the CPU 211 and the supervisory control circuit 219. In addition, when there is a malfunction of the vehicle power supply source, electric power can be supplied from the auxiliary power supply source 12 to the three-phase motor drive circuit 222 via the auxiliary power supply relay 235. By passing through a filter circuit 212, noise in the electric power supplied from outside is removed and then the electric power is supplied to the three-phase motor drive circuit 222.

Here, a method for switching to electric power supply from the auxiliary power supply source 12 when there is a malfunction of a vehicle power supply source will be described. The phrase "a malfunction of a vehicle power supply source" indicates that a vehicle power supply source cannot supply electric power to electric equipments and electronic control equipments mounted on a vehicle due to a vehicle battery failure or a vehicle power generator failure. In cases of hybrid vehicles and electric vehicles, the phrase refers to a motor generator failure, a high voltage battery failure, a DC/DC converter failure, a low voltage battery failure, or the like.

In order to detect a malfunction of a vehicle power supply source, first, the voltage of an electric power supply line extending from a vehicle power supply source is monitored. Then, if the monitored voltage decreases below a given level, it is determined that there is a power supply malfunction. When a malfunction of a vehicle power supply source is detected in such manner, the auxiliary power supply relays 235 and 236 that are turned off in a normal state are turned on. This enables electric power supply from the auxiliary power supply source 12. In addition, when a malfunction of a vehicle power supply source is detected and thus the auxiliary power supply relays 235 and 236 are turned on, it is desirable to turn off the ECU power-supply relay 214 and the fail-safe relay circuit 213. This is because if the reason for a malfunction of a vehicle power supply source is a short circuit failure in a vehicle power supply source system (e.g., a failure in a GND line of a vehicle), electric power from the auxiliary power supply source 12 is consumed until a fuse located upstream of the short circuit area is melted so as to be cut. In addition, it is also possible to create a circuit with a configuration in which a diode is inserted upstream or downstream of each of the ECU power-supply relay 214 and the fail-safe relay circuit 213, provided that the anode of the diode is placed on the vehicle power supply source side.

The CPU 211 receives vehicle information and the signals for controlling demanded automatic-brake hydraulic pressure and the like from the outside of the master-cylinder pressure control device 3 via the CAN communication I/F circuit 218. In addition, the output of each of a rotational-angle detecting sensor 205, a motor-temperature sensor 206, displacement sensors 8a and 8b, and a master-cylinder pressure sensor 57, which are disposed on the side of the master-cylinder pressure controlling mechanism 4, is inputted into the CPU 211 through a rotational-angle detecting sensor I/F circuit 225, a motor-temperature sensor I/F circuit 226, displacement sensor I/F circuits 227 and 228, a master-cylinder pressure sensor I/F circuit 229, respectively.

The CPU 211 receives control signals from the external devices, the detected values of the sensors at present, and the like. The CPU 211 outputs appropriate signals to the three-phase motor drive circuit 222 on the basis of such signals and values, and thereby controls the master-cylinder pressure control device 4. The output end of the three-phase motor drive circuit 222 is connected to the electric motor 20 in the master-cylinder pressure controlling mechanism 4, and the electric motor 20 is driven in accordance with the control by the CPU 211 by converting DC electric power into AC electric power. In this case, for each phase of the three-phase output of the three-phase motor drive circuit 222, a phase-current monitoring circuit 223 and a phase-voltage monitoring circuit 224 are provided. These circuits 223 and 224 monitor the phase currents and the phase voltages, and, on the basis of the information thus provided, the CPU 211 controls the three-phase motor drive circuit 222 so as to make the electric motor 20 in the master-cylinder pressure controlling mechanism 4 operate appropriately. When, for example, the monitor value in the phase-voltage monitoring circuit 224 is out of the normal range, or when the control is not performed as dictated by the control commands, it is determined that there is a failure.

The circuit 201 of the master-cylinder pressure control device 3 includes a memory circuit 230 made of an EEPROM in which the failure information and the like are stored. Signals are exchanged between the memory circuit 230 and the CPU 211. The CPU 211 stores, in the memory circuit 230, the detected failure information, the learned values to be used for controlling the master-cylinder pressure controlling mechanism 4, such as the control gain, the offset values of the sensors, and the like. In addition, the circuit 201 of the master-cylinder pressure control device 3 includes the supervisory control circuit 219. Signals are exchanged between the CPU 211 and the supervisory control circuit 219. The supervisory control circuit 219 monitors failures in the CPU 211, the $V_{CC}1$ voltage, and the like. When detecting abnormality of the CPU 211, the $V_{CC}1$ voltage, or the like, the supervisory control circuit 219 immediately actuates the fail-safe relay circuit 213 so as to cut off the power supply to the three-phase motor drive circuit 222. Note that both the supervisory control circuit 219 and the $V_{CC}2$ voltage are monitored by the CPU 211.

In the configuration described in the Embodiment, the auxiliary power supply relays 235 and 236 are installed in the master-cylinder pressure control device 3 for switching electric power supply from a vehicle power supply source or from the auxiliary power supply source 12 in the master-cylinder pressure control device 3. However, in another configuration, switching from electric power supply from the vehicle power supply source to electric power supply from the auxiliary power supply source 12 may be carried out in a power-supply control device on the vehicle side. In such configuration, only electric power supply lines extending from the vehicle power supply source shown in FIG. 2 may be connected to the master-cylinder pressure control device 3.

Figure 3:
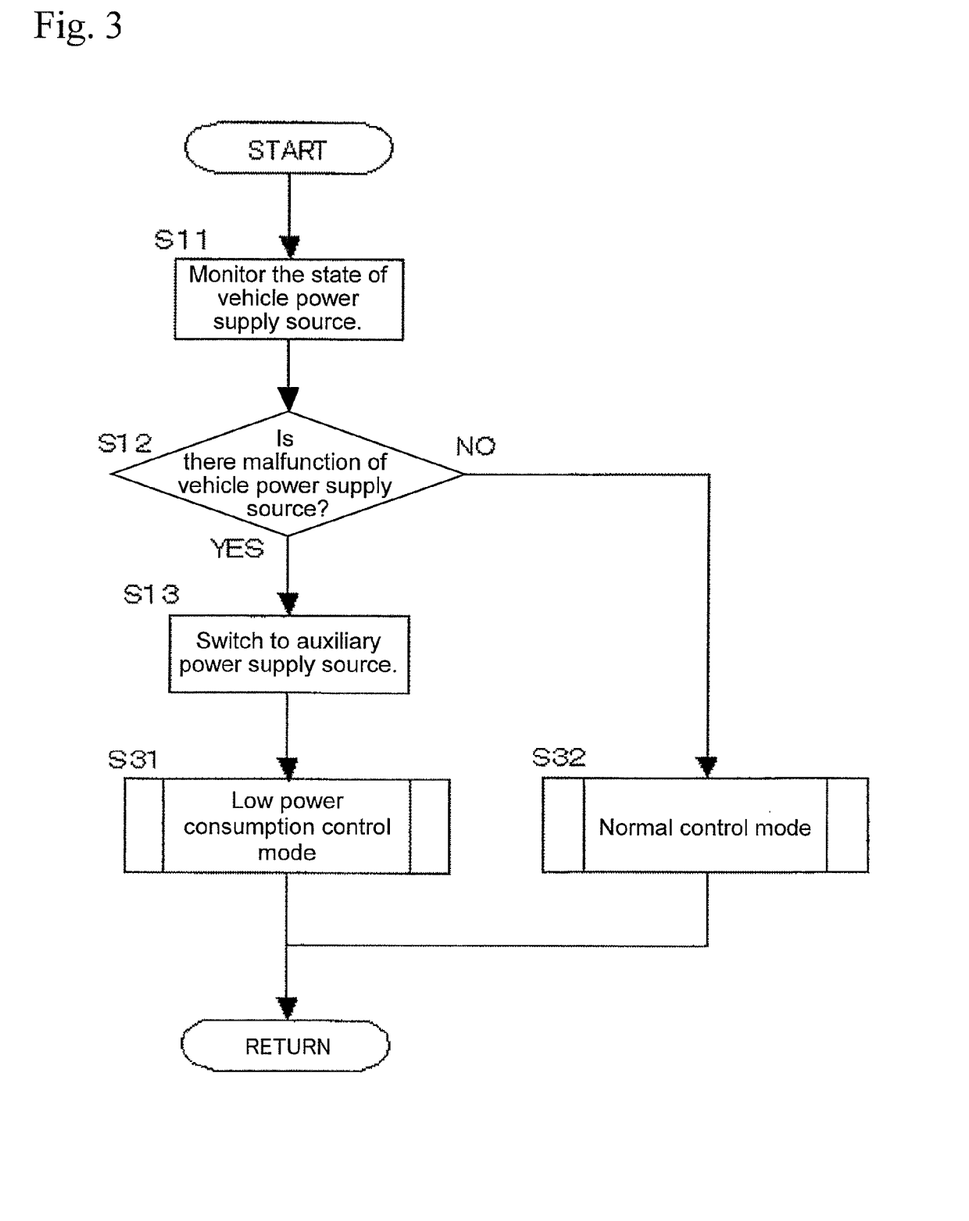
FIG. 3 is an example of a flowchart illustrating an operational procedure related to logic of switching control modes according to the present invention.

The brake control system 1 described in the first embodiment will be further described below in terms of the operation, and particularly switching of control modes and the switching mechanism. FIG. 3 is an example of a flowchart illustrating an operational procedure related to logic of switching control modes. In step S11, the state of a vehicle power supply source is monitored. Then, it is determined in step S12 whether or not there is a malfunction of a vehicle power supply source. Regarding a method for determining whether or not there is a malfunction of a vehicle power supply source by monitoring the state of a vehicle power supply source, the voltage of an electric power supply line extending from a vehicle power supply source is monitored. If the monitored voltage is below a given level, it is determined that there is a malfunction of the vehicle power supply source. Note that if only one electric power supply line extending from a vehicle power supply source is monitored, it could be determined that there is a malfunction of a vehicle power supply source even in a case of disconnection of the monitored line or a failure in the monitor circuit. Therefore, in the circuit configuration comprising two electric power supply lines extending from a vehicle power supply source shown in FIG. 2, voltage monitoring is carried out for two electric power supply lines extending from a vehicle power supply source, which are connected to the ECU power-supply relay 214 and the fail-safe relay circuit 213, respectively. If the monitored voltage is equivalent to or below a given level for both electric power supply lines, it is determined that there is a malfunction of the vehicle power supply source. This facilitates identification of a malfunction of the vehicle power supply source. In addition, in order to discriminate a ground fault of an electric power supply line extending from a vehicle power supply source from a malfunction of a vehicle power supply source, the current of an electric power supply line extending from a vehicle power supply source is monitored. If a large current flows on the vehicle power supply source side, it can be determined that there is a ground fault of the electric power supply line.

If it is determined that there is no malfunction of a vehicle power supply source in step S12, that is to say, a vehicle power supply source is in the normal state and supplying electric power, the normal control mode in step S32 is activated.

In the normal control mode in step S32, the drive current of the electric motor 20 is controlled to allow the master-cylinder pressure control device 3 to continuously function in a normal manner such that the driver's demanded braking force calculated based on the degree of braking operation detected by the operational degree detecting device 8 is generated.

If it is determined in step S12 that there is a malfunction of a vehicle power supply source, switching to electric power supply from the auxiliary power supply source 12 is performed in step S13. According to a method for switching to electric power supply from the auxiliary power supply source 12 by detecting a malfunction of a vehicle power supply source, electric power can be supplied from the auxiliary power supply source 12 by turning on the auxiliary power supply relays 235 and 236 in the off state in the case of the circuit configuration shown in FIG. 2. In addition, it is desirable to turn off the ECU power-supply relay 214 and the fail-safe relay circuit 213 when turning on (i.e., immediately before turning on) the auxiliary power supply relays 235 and 236 after detecting a malfunction of a vehicle power supply source. This is because, if there is a ground fault in a certain area in the vehicle power supply source system, electric power from the auxiliary power supply source 12 is consumed until a vehicle fuse located upstream of the ground fault area is melted so as to be cut. If switching to electric power supply from the auxiliary power supply source 12 is performed in step S13, the low power consumption control mode in step S31 is activated.

In the low power consumption control mode in step S31, a limit is imposed on the drive current of the electric motor 20. Here, the limit of the current for driving the electric motor 20 is set to a level smaller than that in the normal control mode to such an extent that generation of a certain braking force can be ensured. In terms of a backup brake function used in response to a malfunction of a vehicle power supply source, a limit is imposed on the drive current of the electric motor 20 in the above manner to maintain electric power supply from the auxiliary power supply source 12, although the maximum hydraulic pressure generated by a drive force of the electric motor 20 decreases to a level below the normal level.

Also, a method for limiting a target braking force or a target hydraulic pressure can be used in the low power consumption control mode. However, in this case, in terms of a backup brake function used in response to a malfunction of a vehicle power supply source, the consumption current is reduced by decreasing the maximum hydraulic pressure generated by the drive force of the electric motor 20 to a level lower than the normal level. As a result, it is impossible to suppress the current consumed for accelerating the electric motor 20 used until a target a braking force or a target hydraulic pressure is achieved. On the other hand, with the use of a method for limiting the drive current of the electric motor 20, it is possible to suppress the current consumed for accelerating the electric motor 20. Therefore, the maximum hydraulic pressure generated by the drive force of the electric motor 20 can be increased with fewer power consumption, although the time spent for achievement of a target a braking force or a target hydraulic pressure is prolonged.

The low power consumption control mode is described above. In the case of the master-cylinder pressure control device 3 or the master-cylinder pressure controlling mechanism 4 illustrated in FIG. 1, a limit is imposed merely on an assisting force for assisting a force for pressurizing the master cylinder 9 by a drive force of the electric motor 20 that is generated based on the degree of driver's operation of depressing the brake pedal 100. Therefore, the master cylinder hydraulic pressure and the braking force can be increased depending on a force generated upon a driver's operation of depressing the brake pedal 100.

Figure 4:
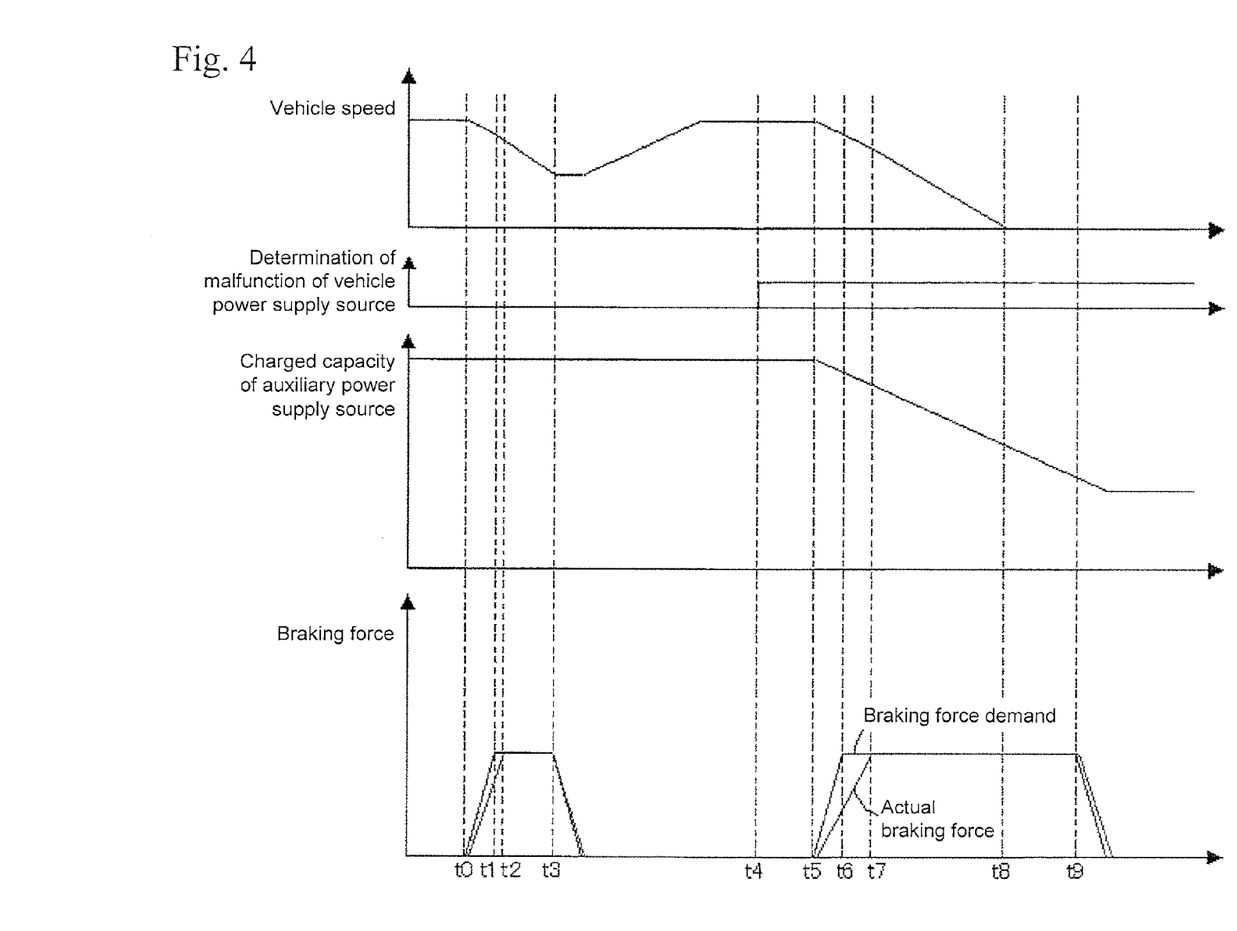
FIG. 4 is a time chart illustrating an example of operation of the brake control device of the present invention.

FIG. 4 is a time chart illustrating an example of an operation of the low power consumption control mode for controlling electric power supply from the auxiliary power supply source 12 when there is a malfunction of a vehicle power supply source.

In FIG. 4, a vehicle is moving at a constant vehicle speed until time t0. A brake-pedal operation is started at time t0 and the brake-pedal operation is maintained at a constant level after time t1. The demanded braking force is calculated in response to the brake-pedal operation. At this time, a vehicle power supply source functions in a normal manner and thus control is carried out in the normal control mode. Accordingly, the actual braking force is generated with a short delay in responsiveness to the demanded braking force such that the actual braking force is stabilized at a constant level at time t2. When a brake pedal is released to stop braking at time t3, calculation is carried out to realize a demanded braking force of 0 in response to the brake-pedal operation. Accordingly, the actual braking force also becomes 0.

When a malfunction of a vehicle power supply source occurs and thus it is determined that there is a malfunction of a vehicle power supply source at time t4, switching to electric power supply from the auxiliary power supply source 12 is performed. Thus, the low power consumption control mode is activated. A brake-pedal operation is started at time t5. The brake-pedal operation is maintained at a constant level after time t6. The demanded braking force is calculated in response to the brake-pedal operation. At this time, control is carried out in the low power consumption control mode such that a limit is imposed on the maximum drive current of the electric motor 20. Accordingly, there is a delay in responsiveness of the actual braking force to the demanded braking force as compared with that in the normal control mode. Note that the demanded braking force described herein is smaller than the maximum braking force that can be generated by driving the electric motor 20 at the current limit determined in the low power consumption control mode. Thus, the actual braking force equivalent to the demanded braking force can be generated to be stabilized at a constant level at time t7. At time t8, a vehicle speed of 0 is achieved, that is to say, the vehicle is in the stationary state. Then, the driver stops the braking operation at time t9. From time t5 to time t9, the master-cylinder pressure control device 3 is driven by electric power supply from the auxiliary power supply source 12. However, since it is driven in the low power consumption control mode, the power consumption of the auxiliary power supply source 12 is smaller than that of the auxiliary power supply source 12 driven in the normal control mode, allowing continuous electric power supply from the auxiliary power supply source 12. In addition, electric power consumed by the electron circuit decreases from time t4 to time t5. However, the electric power consumed is smaller than electric power consumed when the electric motor 20 is driven. Therefore, reduction in the charged capacity of the auxiliary power supply source 12 is not shown in the figure.

Next, systems to which the above method for controlling the low power consumption control mode is applied will be described below.

Figure 5:
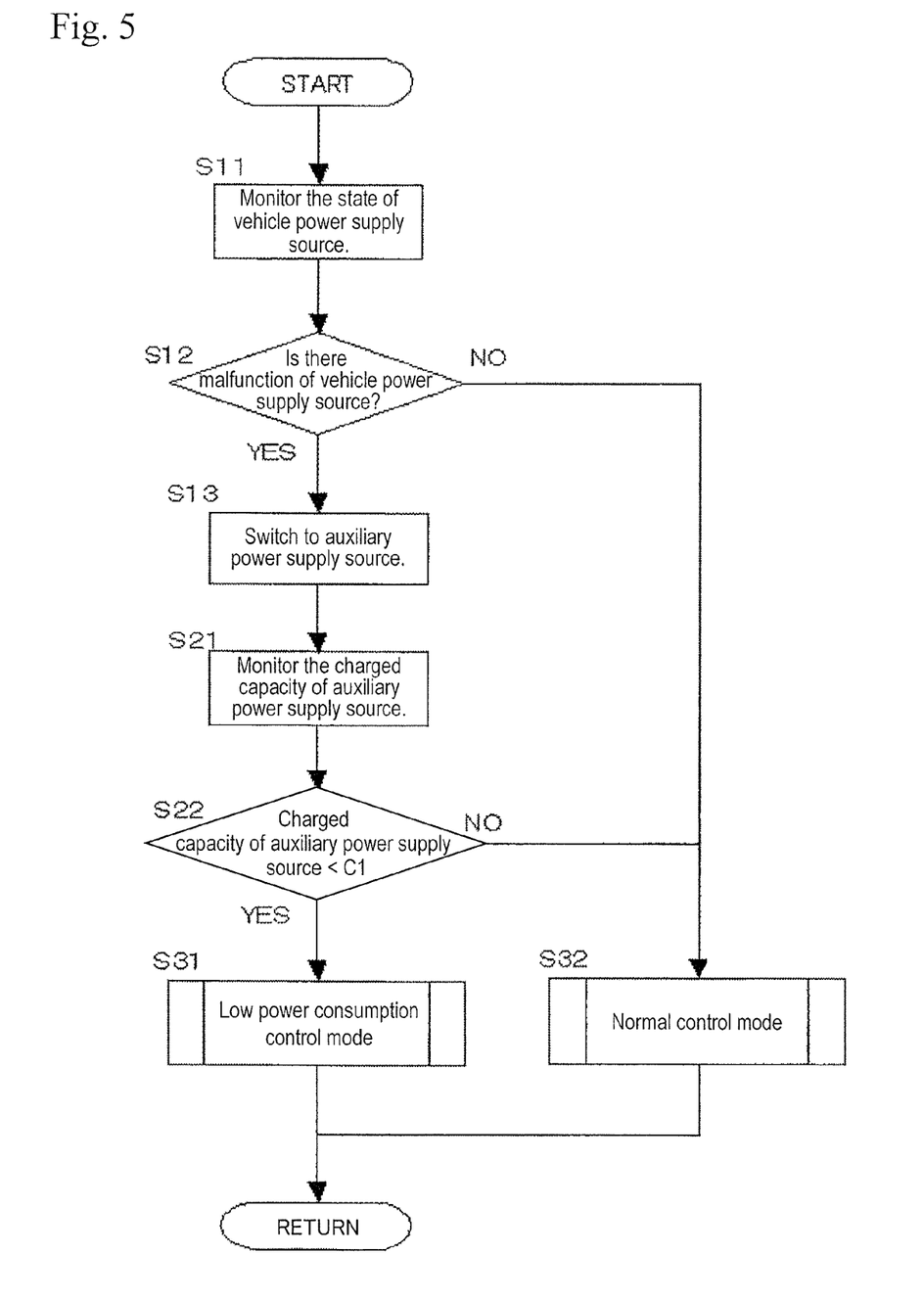
FIG. 5 is an example of a flowchart illustrating an operational procedure related to logic of switching control modes according to the present invention.

The first system is a system in which a limit is imposed on the drive current of the electric motor 20 depending on the charged capacity of the auxiliary power supply source 12. FIG. 5 is an example of a flowchart illustrating the first system. Step S11 to step S13, step S31, and S32 are not explained herein because they are the same as in FIG. 3. When it is determined that there is a malfunction of a vehicle power supply in step S12, switching to electric power supply from the auxiliary power supply source 12 is performed in step S13. Then, the charged capacity of the auxiliary power supply source 12, that is to say, the degree of available electric energy supply, is monitored in step S21. Here, the charged capacity of the auxiliary power supply source 12 can be detected based on the voltage of an auxiliary power supply source line. Alternatively, it may be detected based on the voltage of the auxiliary power supply source line, the charge-discharge current, temperature, or the like. In addition, it is determined in step S22 whether or not the charged capacity of the auxiliary power supply source 12 is lower than a given level. If it is equivalent to or exceeds a given level, the normal control mode in step S32 is continued. If it is below a given level, the low power consumption control mode in step S31 is activated.

The above first system is a system in which the limit of the motor driving current is changed depending on the charged capacity of the auxiliary power supply source 12. For example, it is a system in which the limit of the motor driving current is decreased as the charged capacity of the auxiliary power supply source 12 decreases.

Figure 6:
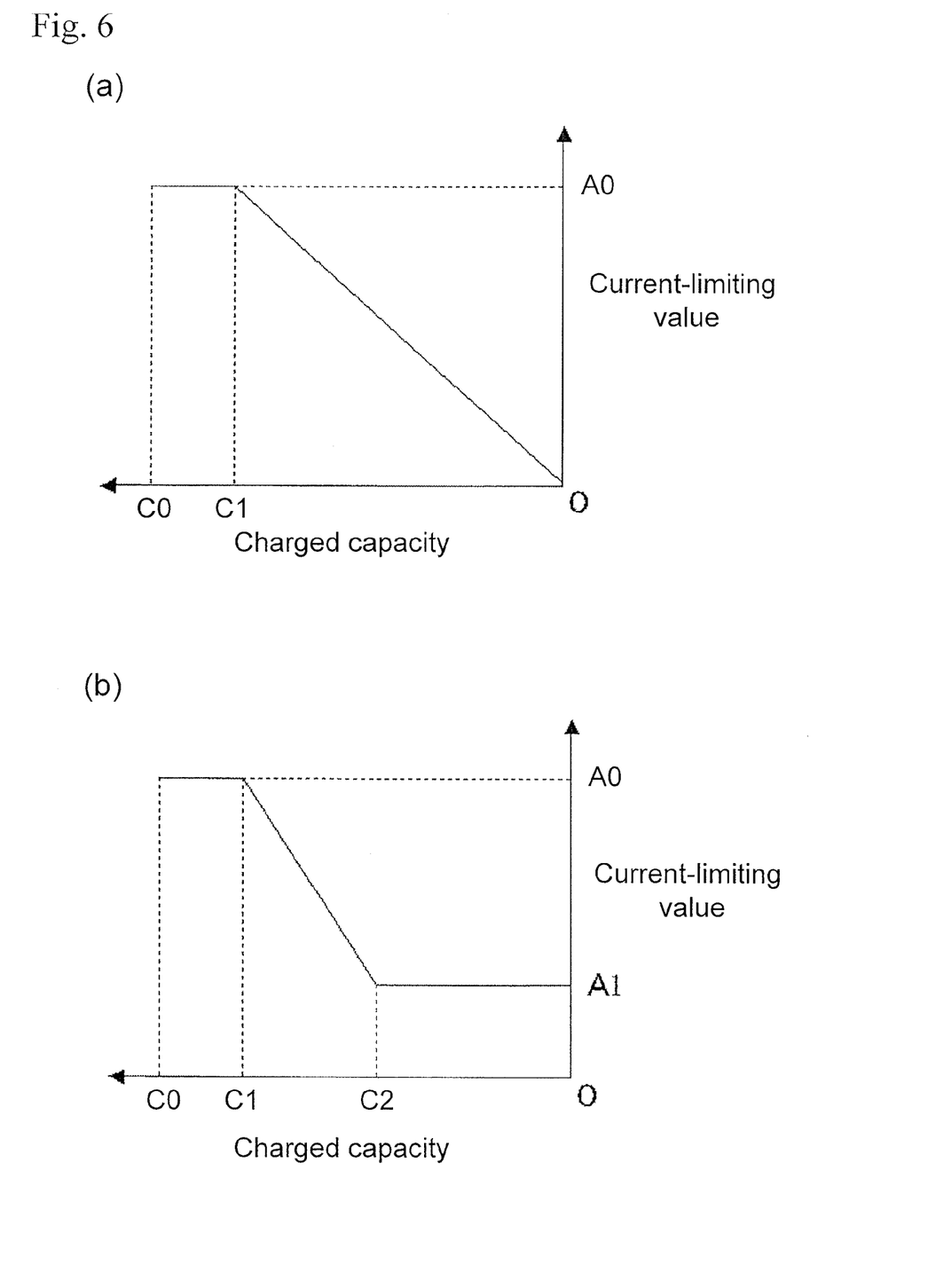
FIG. 6 is an example showing steps of a method for limiting the control mode current according to the present invention.

Each of FIGS. 6(a) and (b) shows the limit of the motor driving current relative to the charged capacity of the auxiliary power supply source 12 in the first system. In the example shown in FIG. 6(a), the current equivalent to or less than the maximum drive current A0 of the master-cylinder pressure control device 3 can be used until the charged capacity of the auxiliary power supply source 12 decreases to the charged capacity C1, as in the case of the normal control mode. However, if the charged capacity of the auxiliary power supply source 12 decreases below the charged capacity C1, the limit of the motor driving current is gradually decreased as the charged capacity of the auxiliary power supply source 12 decreases in a manner such that when the charged capacity of the auxiliary power supply source 12 becomes 0, the limit value of the motor drive current becomes 0. In the example shown in FIG. 6(b), the current equivalent to or less than the maximum drive current A0 of the master-cylinder pressure control device 3 can be used until the charged capacity of the auxiliary power supply source 12 decreases to the charged capacity C1, as in the case of the normal control mode. However, if the charged capacity of the auxiliary power supply source 12 decreases below the charged capacity C1, the limit of the motor driving current is gradually decreased as the charged capacity of the auxiliary power supply source 12 decreases in a manner such that when the charged capacity of the auxiliary power supply source 12 decreases to the charged capacity C2, the limit of the motor driving current is set to the minimum necessary current value A1. In addition, in FIGS. 6(a) and 6(b), if the charged capacity of the auxiliary power supply source 12 decreases below the charged capacity C1, a decrease in the limit of the motor driving current relative to the charged capacity of the auxiliary power supply source 12 is expressed by a linear function. However, a quadratic or superquadric function or nonlinear function obtained by mapping may be used.

Figure 7:
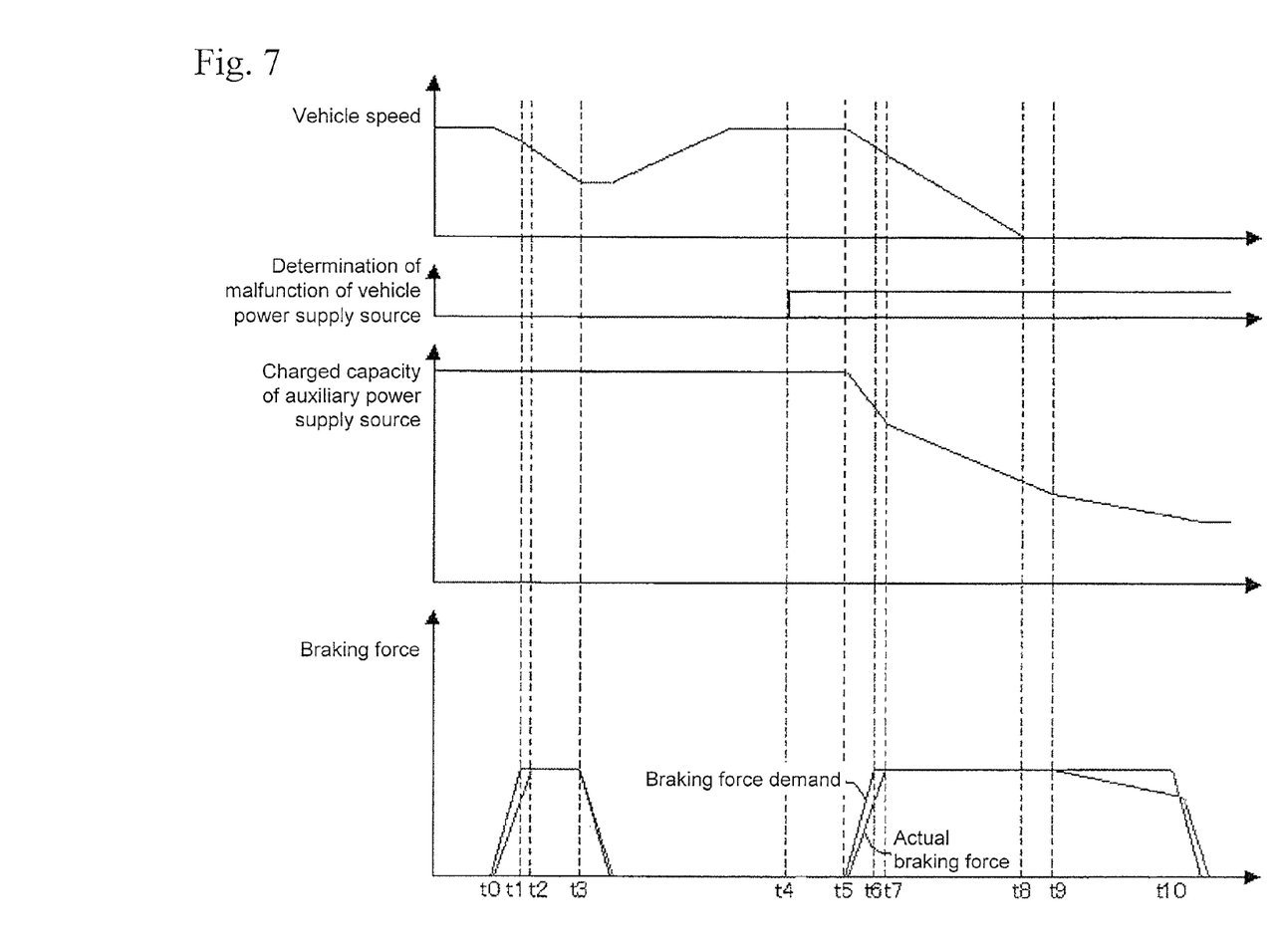
FIG. 7 is a time chart illustrating an example of operation of the brake control device of the present invention.

FIG. 7 is a time chart illustrating an example of control of electric power supply from the auxiliary power supply source 12 in the first system, in which the limit of the motor driving current is changed depending on the charged capacity of the auxiliary power supply source 12 when there is a malfunction of a vehicle power supply source. The process from time t0 to t4 is not explained herein because it is the same as in FIG. 4. A brake-pedal operation is started at time t5 and the brake-pedal operation is maintained at a constant level after time t6. A demanded braking force is calculated in response to the brake-pedal operation. At this time, a malfunction of a vehicle power supply source occurs and thus electric power is supplied from the auxiliary power supply source 12. However, since there is no decrease in the charged capacity of the auxiliary power supply source 12, the limit of the motor driving current is equivalent to that in the normal control mode. Thus, the actual braking force is generated with a short delay in responsiveness to the demanded braking force as in the case of the normal control mode. Accordingly, the actual braking force is stabilized at a constant level at time t7. At time t8, a vehicle speed of 0 is achieved, that is to say, the vehicle is in the stationary state. Then, the driver stops the braking operation at time t10. However, if the charged capacity of the auxiliary power supply source 12 is below a given level at time t9 between time t8 and time t10, the current limit gradually decreases as the charged capacity of the auxiliary power supply source 12 decreases. Therefore, if the braking operation is constantly maintained, the actual braking force also gradually decreases. In addition, in the case of the master-cylinder pressure control device 3 or the master-cylinder pressure controlling mechanism 4 illustrated in FIG. 1, if the braking operation is intensified after time t9, the braking force can be increased depending on a brake pedal depressing force. As described above, the power consumption of the auxiliary power supply source 12 can be suppressed by maintaining the responsiveness of a brake control device obtained at the beginning of braking as in the case of the normal mode with the use of the first system.

Figure 8:
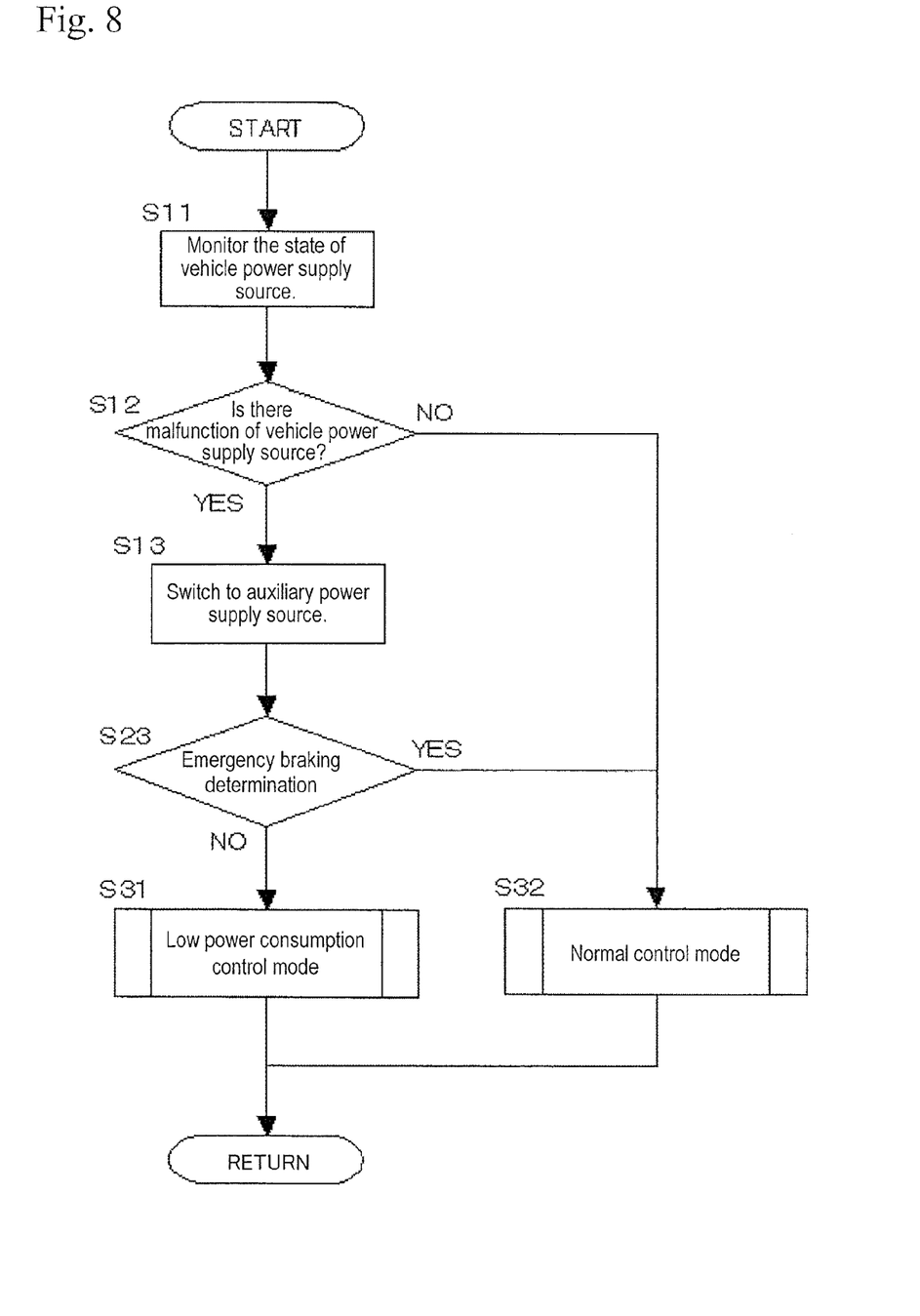
FIG. 8 is an example of a flowchart illustrating an operational procedure related to logic of switching control modes according to the present invention.

The second system is a system in which a master-cylinder pressure control device 3 is controlled in a normal manner, i.e., in the normal control mode, only when emergency braking is necessary. FIG. 8 is a flowchart of the second system. Step S11 to step S13, step S31, and step S32 are not explained herein because they are the same as in FIG. 3. When it is determined in step S12 that there is a malfunction of a vehicle power supply source, it is determined in step S13 whether or not it corresponds to emergency braking. It can be determined that the malfunction corresponds to emergency braking if the degree of braking operation exceeds a given level and/or the braking operation speed is faster than a given speed. If it is determined that the malfunction corresponds to emergency braking, the normal control mode in step S32 is continued. If it does not correspond to emergency braking, the low power consumption control mode in step S31 is activated. With the use of the second system, even if a malfunction of a vehicle power supply source occurs in a situation that requires emergency braking, emergency braking can be performed. That is, when it is determined that there is a malfunction of a vehicle power supply source, if the degree of braking operation is high or the braking operation speed is fast, the malfunction is regarded as corresponding to an emergency case. In such case, emergency braking can be performed by setting the limit of the motor driving current to a level equivalent to the level at the time of electric power supply from a main power supply source during normal power supply so as to increase the current supplied to the electric motor 20. Alternatively, if the degree of braking operation is not so high or the braking operation speed is not so fast, emergency braking can be performed by setting the limit of the motor driving current to a level lower than the level at the time of electric power supply from a main power supply source during normal power supply so as to suppress the power consumption of the auxiliary power supply source 12.

Figure 9:
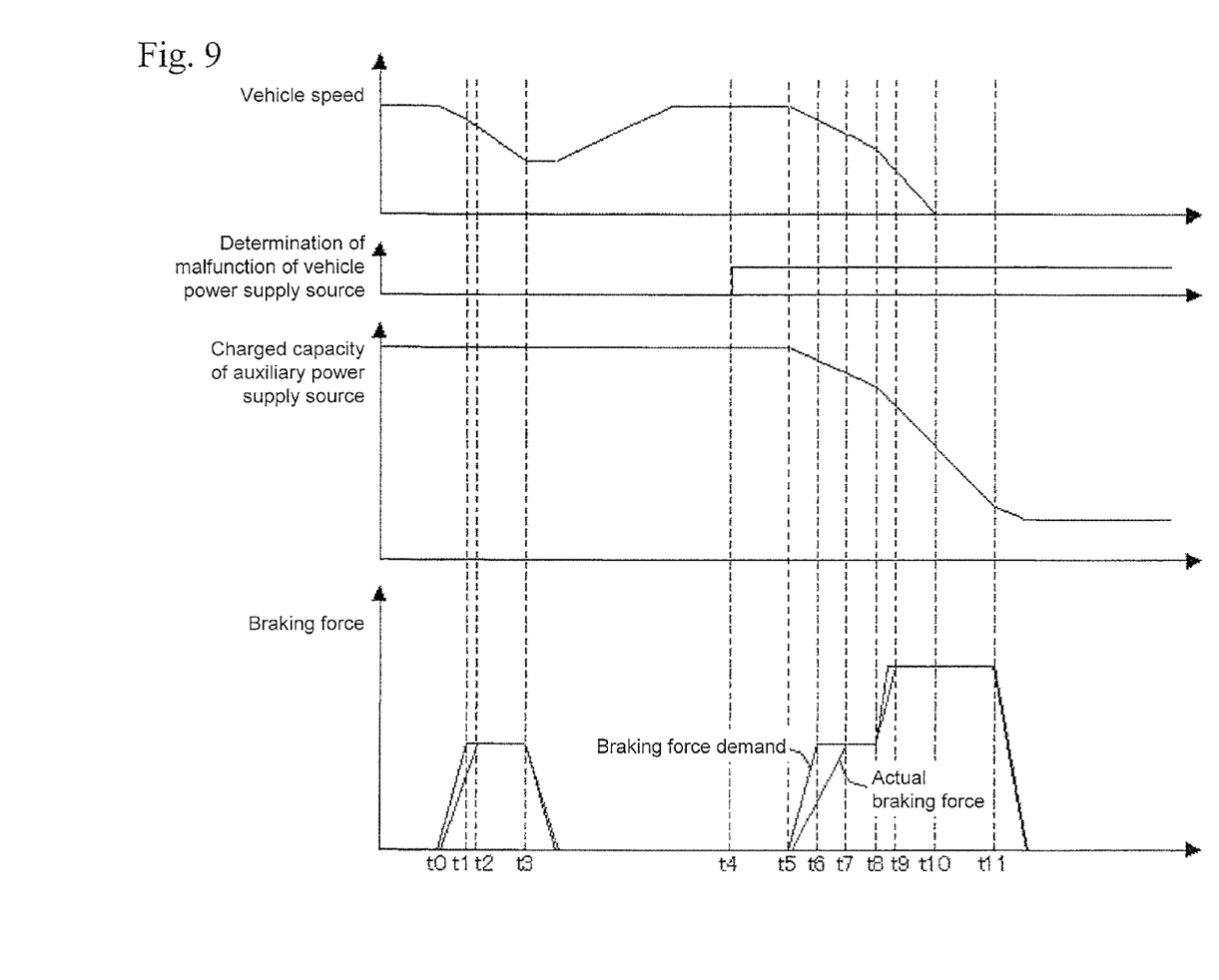
FIG. 9 is a time chart illustrating an example of operation of the brake control device of the present invention.

FIG. 9 is a time chart illustrating an example of control of electric power supply from the auxiliary power supply source 12 in the second system when there is a malfunction of a vehicle power supply source. The process from time t0 to time t7 is not explained herein because it is the same as in FIG. 4. For example, when the speed is constantly decreased in the low power consumption mode from time t7, if an obstruction is found in front of the vehicle at time t18, an emergency braking operation is started and a brake pedal is increasingly depressed until time t9. In such case, the operation is regarded as corresponding to emergency braking. Accordingly, the maximum current limit is cancelled and the normal control mode is activated. Subsequently, sudden deceleration is started from time t9. At time t10, a vehicle speed of 0 is achieved, that is to say, the vehicle is in the stationary state. Then, the driver stops the braking operation at time t11. In the above case, the master-cylinder pressure control device 3 is driven with electric power supplied from the auxiliary power supply source 12 from time t5 to t8. However, since it is driven in the low power consumption control mode, the power consumption of the auxiliary power supply source 12 can be reduced compared to that in the normal control mode. Further, if emergency braking is necessary, emergency braking is permitted. Thus, safety also can be ensured.

The two systems to which the method for controlling the low power consumption control mode is applied are described above. It is also possible to use the two systems in combination.

In addition, the example in which switching to the auxiliary power supply source 12 is performed when there is a malfunction of a vehicle power supply source is described above. However, the present invention also can be applied to a case in which the voltage of a vehicle power supply source decreases due to overload in a vehicle electronic equipment or the like. In such case, if voltage reduction in the vehicle power supply source is detected in step S12 in FIG. 5, the voltage of the vehicle power supply source is read in step S21 in response to the detection of voltage reduction. If the voltage of the vehicle power supply source is found to be at a given level or less in step S22, the low power consumption control mode in step S31 is activated. Thus, the present invention can be carried out. In addition, it is possible to use, as the first system to which the method for controlling the low power consumption control mode is applied, a system in which the limit of the motor driving current is changed depending on the voltage of a vehicle power supply source. In this case, the present invention can be carried out by replacing the charged capacity in FIG. 6 by the voltage of the vehicle power supply source. This method for changing the limit of the motor driving current by activating the low power consumption control mode when the voltage of the vehicle power supply source decreases can be applied to a vehicle provided with no auxiliary power supply source 12.

The brake control system 1 used in Embodiment 1 is described above in terms of the operation, and particularly switching of control modes and the switching mechanism. The present invention can be applied to an electric caliper to generate a braking force by controlling thrust of a caliper with a motor and a brake-by-wire system for, for example, a fluid-pressure electric brake to generate a braking force by driving/controlling electric fluid-pressure pumps so as to pressurize wheel cylinders, in addition to the brake control system 1 in Embodiment 1.

EXPLANATION OF REFERENCE NUMERALS

1: Brake control system
4: Master-cylinder pressure controlling mechanism
7: Input rod
8: Operational degree detecting device
9: Master cylinder
10: Reservoir tank
12: Auxiliary power supply source
16: Input piston
20: Electric motor
25: Rotation-translation movement converting device
40: Assisting piston
41: Secondary piston
42: Primary fluid chamber
43: Secondary fluid chamber
55: Motor
56, 57: Master-cylinder pressure sensor
100: Brake pedal

The invention claimed is:

1. A brake control device comprising:
a master cylinder configured to generate hydraulic pressure, the hydraulic pressure generating a braking force;
an electric motor configured to control the hydraulic pressure in the master cylinder;
a control circuit configured to generate a current that drives the electric motor with electric power supplied from a main power supply source; and
an auxiliary power supply source, wherein
the control circuit is configured to calculate a demanded braking force corresponding to an operation amount of a brake pedal,
the current that drives the electric motor is generated on the basis of the calculated demanded braking force,
the electric motor is configured to convert the hydraulic pressure generated in the master cylinder into the demanded braking force,
when there is an abnormality in the main power supply source, the control circuit carries out braking control with electric power supplied from the auxiliary power supply source in the following manner:
the control circuit determines whether or not the brake pedal operation corresponds to emergency braking, and
if the control circuit determines that the brake pedal operation does not correspond to the emergency braking, the current that drives the electric motor is reduced in response to the brake pedal operation carried out under conditions equivalent to the conditions for carrying out braking control with electric power supplied from the main power supply source, and
if the control circuit determines that the brake pedal operation corresponds to the emergency braking, the current that drives the electric motor is substantially maintained at a same level in response to the brake pedal operation carried out under conditions equivalent to the conditions for carrying out braking control with electric power supplied from the main power supply source.

2. A brake control device comprising:
a master cylinder configured to transmit hydraulic pressure, the hydraulic pressure generating a braking force;
an input piston configured to control the hydraulic pressure in the master cylinder through movement by a distance that corresponds to an operation amount of a brake pedal;
an assisting piston configured to control the hydraulic pressure in the master cylinder together with the input piston;
an electric motor configured to move the assisting piston; and
a control circuit configured to control the electric motor based on the operation amount of the brake pedal, the control circuit having electric power terminals to receive electric power from a main power supply source and an auxiliary power supply source, respectively, wherein
the control circuit is configured to control the electric motor based on the operation amount of the brake pedal when the control circuit is operated with electric power from the main power source, provided that a limit is imposed on a current that drives the electric motor when the control circuit is operated with the electric power from the auxiliary power source, and
the control circuit is configured to perform braking control based on the operation amount of the brake pedal in the following manner:
a rate of decline in the current that drives the electric motor, when the operation amount of the brake pedal is low, is made larger than a rate of decline in the current that drives the electric motor when the operation amount of the brake pedal is high, such rate of decline being obtained by comparing the current that drives the electric motor that is operated with the electric power supplied from the auxiliary power supply source with the current that drives the electric motor that is operated with the electric power supplied from the main power supply source.

3. A brake control device comprising:
a master cylinder configured to generate a hydraulic pressure, the hydraulic pressure generating a braking force;
an electric motor configured to control the hydraulic pressure in the master cylinder;
a control circuit configured to generate a current that drives the electric motor with electric power supplied from a main power supply source; and
an auxiliary power supply source, wherein
the control circuit is configured to calculate a demanded braking force corresponding to an operation amount of a brake pedal,
the current that drives the electric motor is generated on the basis of the calculated demanded braking force,
the electric motor is configured to convert the hydraulic pressure generated in the master cylinder into the demanded braking force,
the control circuit generates the current for driving the electric motor on the basis of the demanded braking force calculated based on an operation amount of the brake pedal, and
when there is an abnormality in the main power supply source, if the maximum operation amount of the brake pedal is maintained at a substantially constant level during plural consecutive operations of the brake pedal,
the control circuit generates a current that drives the electric motor with substantially a same current during a first phase corresponding to at least two brake pedal operations of the plural consecutive operations.

4. The brake control device according to claim 3, wherein the control circuit subsequently reduces the current that drives the electric motor to a lower level than a level of the current for braking control with electric power supplied from the main power supply source during a second phase that begins after the first phase.

* * * * *